United States Patent
Sakamoto et al.

(10) Patent No.: US 12,502,637 B2
(45) Date of Patent: Dec. 23, 2025

(54) SOLID RECOVERY MATERIAL FOR CARBON DIOXIDE AND METHOD FOR PRODUCING SAME

(71) Applicant: TODA KOGYO CORP., Hiroshima (JP)

(72) Inventors: Muneyoshi Sakamoto, Otake (JP); Nobuya Shimo, Otake (JP); Eiichi Kurita, Otake (JP)

(73) Assignee: TODA KOGYO CORP., Hiroshima (JP)

(*) Notice: Subject to any disclaimer, the term of this patent is extended or adjusted under 35 U.S.C. 154(b) by 381 days.

(21) Appl. No.: 18/040,393

(22) PCT Filed: Jul. 29, 2021

(86) PCT No.: PCT/JP2021/027994
§ 371 (c)(1),
(2) Date: Feb. 2, 2023

(87) PCT Pub. No.: WO2022/030338
PCT Pub. Date: Feb. 10, 2022

(65) Prior Publication Data
US 2023/0277977 A1     Sep. 7, 2023

(30) Foreign Application Priority Data

Aug. 4, 2020  (JP) ................. 2020-132136
Oct. 29, 2020 (JP) ................. 2020-181617

(51) Int. Cl.
*B01D 53/14* (2006.01)
*B01J 20/02* (2006.01)
(Continued)

(52) U.S. Cl.
CPC ...... *B01D 53/1475* (2013.01); *B01J 20/0229* (2013.01); *B01J 20/04* (2013.01);
(Continued)

(58) Field of Classification Search
CPC . B01D 53/14; B01J 20/02; B01J 20/04; B01J 20/10; B01J 20/20; B01J 20/28; B01J 20/30
See application file for complete search history.

(56) References Cited

FOREIGN PATENT DOCUMENTS

JP     H07-237923 A    9/1995
JP     2010-063989 A   3/2010
(Continued)

OTHER PUBLICATIONS

Yanase (Year: 2018).*
(Continued)

*Primary Examiner* — Sharon Pregler
(74) *Attorney, Agent, or Firm* — Knobbe, Martens, Olson & Bear, LLP

(57) ABSTRACT

A solid recovery material for carbon dioxide includes from 1% by weight to 99% by weight of sodium ferrite and from 1% by weight to 99% by weight of porous material. The material has an average particle diameter of 1 mm to 10 mm, and having a specific surface area of 5 m²/g to 1500 m²/g. An axial ratio of an average major axis diameter to an average minor axis diameter of primary particles of the sodium ferrite is from 1 to 2.

9 Claims, 2 Drawing Sheets

(51) Int. Cl.
  *B01J 20/04* (2006.01)
  *B01J 20/10* (2006.01)
  *B01J 20/20* (2006.01)
  *B01J 20/28* (2006.01)
  *B01J 20/30* (2006.01)

(52) U.S. Cl.
  CPC .............. *B01J 20/103* (2013.01); *B01J 20/20* (2013.01); *B01J 20/28004* (2013.01); *B01J 20/28057* (2013.01); *B01J 20/30* (2013.01)

(56) References Cited

FOREIGN PATENT DOCUMENTS

| | | | |
|---|---|---|---|
| JP | 2016-003156 | A | 1/2016 |
| JP | 2017-109198 | A | 6/2017 |
| JP | 6383188 | B2 * | 8/2018 |
| WO | WO 2021/117623 | A1 | 6/2021 |

OTHER PUBLICATIONS

Grey et al., A structural study of the incorporation of silica into sodium ferrites, $Na_{1-x}[Fe_{1-x}Si_xO_2]$, x=0 to 0.20, Journal of Solid State Chemistry, vol. 85, pp. 202-219, 1990.

Extended European Search Report dated Aug. 13, 2024 in EP Patent Application No. 21852264.7, in 9 pages.

Takasu et al., Sodium Ferrite/Carbon Dioxide Reactivity for High Temperature Thermochemical Energy Storage, ISIJ International, vol. 59, No. 4, pp. 715-720, 2019.

International Search Report, mailed Sep. 7, 2021, for PCT/JP2021/027994.

Hackley, et al., The Use of Nomenclature in Dispersion Science and Technology, National Institute of Standards and Technology, Special Publication 960-3, Aug. 2001.

Zook, et al., Reliable preparation of nanoparticle agglomerates of different sizes in cell culture media, National Institute of Standards and Technology, NIST Special Publication 1200-14, May 2015.

* cited by examiner

SOLID RECOVERY MATERIAL FOR CARBON DIOXIDE AND METHOD FOR PRODUCING SAME

PRIORITY AND CROSS REFERENCE TO RELATED APPLICATIONS

This application is the U.S. National Stage Application under 35 U.S.C. § 371 of International Application No. PCT/JP2021/027994, filed Jul. 29, 2021, designating the U.S. and published as WO 2022/030338 A1 on Feb. 10, 2022, which claims the benefit of Japanese Patent Application No. JP 2020-132136, filed Aug. 4, 2020, and the benefit of Japanese Patent Application No. JP 2020-181617, filed Oct. 29, 2020. Any and all applications for which a foreign or a domestic priority is claimed is/are identified in the Application Data Sheet filed herewith and is/are hereby incorporated by reference in their entirety under 37 C.F.R. § 1.57.

TECHNICAL FIELD

The present invention relates to solid recovery materials for fixing carbon dioxide and methods for producing the solid recovery materials, and specifically, to a solid recovery material including sodium ferrite and a method for producing the solid recovery material.

BACKGROUND ART

Studies on capturing and storing carbon dioxide as well as its recovery and utilization have been underway to reduce the amount of the carbon dioxide released into the atmosphere. Examples of a large-scale source of carbon dioxide include thermal power stations, boilers of factories, and kilns of cement factories using, for example, coal, heavy oil, or natural gas as a fuel. Other examples are blast furnaces of ironworks where iron oxide is reduced by cokes and transportation vehicles, such as automobiles, marine vessels, and aircraft, using, for example, gasoline, heavy oil, or light oil as a fuel.

Currently, large-scale facilities such as thermal power stations fix and recover carbon dioxide with an amine aqueous solution. This method uses a recovery material in liquid form and thus has the advantage that the recovery material can be transported with a pump.

The method described above, however, uses a liquid including a hazardous material and is thus difficultly used in medium to small-scale facilities such as waste incineration plants. Consequently, carbon dioxide is rarely fixed and recovered at present. Therefore, a solid recovery material made of a solid, in particular, a non-hazardous inorganic material, for carbon dioxide is in demand. An example of conventional solid recovery materials for carbon dioxide is, as disclosed in, for example, Patent Literature 1 and Patent Literature 2, a carbon dioxide recovery material containing sodium ferrite. Particularly, in the case of α-sodium ferrite having a layered rock-salt structure (in a trigonal system), carbon dioxide and sodium topochemically react with each other. That is, during the reaction with carbon dioxide, the α-sodium ferrite forms a mixed phase of $Na_{1-x}FeO_2$ and sodium carbonate. Therefore, it has been reported that the speed of this reaction is high and repetition performance of absorbing and releasing carbon dioxide through this reaction is excellent. In contrast, in the case of β-sodium ferrite in an orthorhombic system, sodium and carbon dioxide react with each other, and therefore, it has been reported that the absorbed amount of the carbon dioxide is larger in the crystal phase of the β-sodium ferrite than in the crystal phase of the α-sodium ferrite.

In general, the reaction of sodium ferrite with carbon dioxide is represented by the following formula: $NaFeO_2 + \frac{1}{2}CO_2 \rightarrow \frac{1}{2}Na_2CO_3 + \frac{1}{2}Fe_2O_3$, where a gas includes no water vapor, or $NaFeO_2 + CO_2 + \frac{1}{2}H_2O \rightarrow NaHCO_3 + \frac{1}{2}Fe_2O_3$, where the gas includes the water vapor. Therefore, the sodium ferrite is theoretically capable of adsorbing and desorbing from 18 to 28% by weight of carbon dioxide at maximum with respect thereto.

CITATION LIST

Patent Literature

[Patent Literature 1] Japanese Laid-Open Patent Publication No. 2016-3156
[Patent Literature 2] Japanese Laid-Open Patent Publication No. 2017-109198

SUMMARY OF INVENTION

Technical Problem

The solid recovery materials for carbon dioxide described in Patent Literature 1 and Patent Literature 2 include, as described above, sodium ferrite and are assumed to be solid recovery materials having a relatively good absorbing performance for carbon dioxide in a low temperature range. However, a carbon dioxide recovery material having further enhanced fixation and recovery performance for carbon dioxide is still in demand, and therefore, further improvement in the characteristic of the sodium ferrite in a form to be mounted on a carbon dioxide recovery device is required in addition to improving the characteristic of the sodium ferrite itself. Specifically, sodium ferrite powder is operationally difficultly handled in its powder form. In particular, when an adsorption tower is filled with sodium ferrite, fine powder of the sodium ferrite is close-packed and easily leads to pressure loss, and therefore, the sodium ferrite powder is used by being carried by a predetermined carrier or by being granulated into a predetermined shape. Therefore, the composition and the physical property of the carbon dioxide recovery material containing sodium ferrite in a carried state or in a granulated state become important.

In view of the problem described above, it is an object of the present invention to provide a solid recovery material for carbon dioxide and a method for producing the solid recovery material, wherein the solid recovery material is capable of fixing carbon dioxide in a low temperature range, for example, from a room temperature to 200° C. and recovering the carbon dioxide when heated to 50 to 200° C., and is thus excellent in fixation and recovery performance.

Solution to Problem

To achieve the object, in the present invention, sodium ferrite is carried by a porous material under a predetermined condition or is granulated by the porous material so as to be able to fix carbon dioxide in a temperature range from a room temperature to 200° C. and highly efficiently recover the carbon dioxide thus fixed when heated to 50 to 200° C.

Specifically, a solid recovery material for carbon dioxide according to the present invention is a solid recovery material including from 1% by weight to 99% by weight of sodium ferrite and from 1% by weight to 99% by weight of porous material, wherein the solid recovery material has an average particle diameter of 1 mm to 10 mm and has a specific surface area of 5 m$^2$/g to 1500 m$^2$/g, and an axial ratio of an average major axis diameter to an average minor axis diameter of primary particles of the sodium ferrite is from 1 to 2.

According to the solid recovery material for carbon dioxide of the present invention, using the porous material enables a molded body containing sodium ferrite at a high concentration to be formed. Thus, the solid recovery material, including the sodium ferrite and the porous material, for carbon dioxide according to the present invention is capable of having excellent performance of fixing the carbon dioxide in a gas, confining the carbon dioxide in a solid, and recovering the carbon dioxide when heated. Moreover, when the average particle diameter is from 1 to 10 mm, a flow path for an exhaust gas and the like can be secured without reducing the pressure loss due to close-packed fine powder when the solid recovery material is filled in the adsorption tower and the like. As a result, the carbon dioxide can be efficiently fixed. Moreover, since the axial ratio of the average major axis diameter to the average minor axis diameter of the primary particles is from 1 to 2, that is, small, and the shape of the primary particles is almost spherical, and therefore, the dispersibility is high, so that the primary particles are less likely to aggregate, thereby improving moldability and/or workability. According to the solid recovery material for carbon dioxide of the present invention, a combination of these characteristics enables the carbon dioxide to be fixed in a temperature range from the room temperature to 200° C. and enables the carbon dioxide to be recovered by heating to 50 to 200° C., and thus, fixation and recovery performance is excellent.

Preferably, the solid recovery material for carbon dioxide according to the present invention includes from 1% by weight to 70% by weight of the sodium ferrite, includes from 30% by weight to 99% by weight of the porous material, and has a specific surface area of 100 m$^2$/g to 1500 m$^2$/g.

With this configuration, a surface of the porous material as a carrier carries a large amount of sodium ferrite, thereby forming a molded body containing the sodium ferrite at a high density. Thus, the solid recovery material, including the sodium ferrite and the porous material, for carbon dioxide according to the present invention is capable of having excellent performance of fixing the carbon dioxide in a gas, confining the carbon dioxide in a solid, and recovering the carbon dioxide when heated. Moreover, when 1% by weight to 70% by weight of the sodium ferrite are carried by 30% by weight to 99% by weight of the porous material, a specific surface area of less than 100 m$^2$/g causes the sodium ferrite less likely to come into contact with carbon dioxide in the gas, thereby reducing the fixation and recovery performance for carbon dioxide, whereas a specific surface area of greater than 1500 m$^2$/g makes industrial production difficult.

In this case, the hardness is preferably from 5 kgf/mm$^2$ to 35 kgf/mm$^2$, and the bulk density is preferably from 0.3 g/mL to 0.8 g/mL.

In this case, the solid recovery material is less likely to break due to, for example, gravity and/or friction caused by a flow of an exhaust gas or the like when filled in the adsorption tower or the like, so that the exhaust gas or the like easily flows.

Preferably, the solid recovery material for carbon dioxide according to the present invention includes greater than 70% by weight and less than or equal to 99% by weight of the sodium ferrite, includes greater than or equal to 1% by weight and less than 30% by weight of the porous material, and has a specific surface area of 5 m$^2$/g to 500 m$^2$/g.

With this configuration, the porous material can accelerate the aggregation of the sodium ferrite particles, thereby forming a molded body containing sodium ferrite at a high concentration. Thus, the solid recovery material, including the sodium ferrite and the porous material, for carbon dioxide according to the present invention is capable of having excellent performance of adsorbing the carbon dioxide in a gas, confining the carbon dioxide in the solid, and desorbing the carbon dioxide when heated. Moreover, when greater than 70% by weight and less than or equal to 99% by weight of the sodium ferrite are granulated by greater than or equal to 1% by weight and less than 30% by weight of the porous material, a specific surface area of less than 5 m$^2$/g causes the sodium ferrite less likely to come into contact with carbon dioxide in the gas, thereby reducing the fixation and recovery performance for carbon dioxide, whereas a specific surface area of greater than 500 m$^2$/g makes industrial production difficult.

In this case, the hardness is preferably from 3 kgf/mm$^2$ to 30 kgf/mm$^2$, and the degree of sphericity is preferably from 1 to 2.

In this case, the solid recovery material is less likely to break due to, for example, gravity and/or friction caused by a flow of an exhaust gas or the like when filled in the adsorption tower or the like, so that the exhaust gas or the like easily flows.

In the solid recovery material for carbon dioxide according to the present invention, a powder pH value is preferably from 8 to 14.

According to this configuration, the solid recovery material for carbon dioxide according to the present invention is basic and thus easily captures the carbon dioxide which is weakly acidic.

In the solid recovery material for carbon dioxide according to the present invention, a molar ratio of Na/Fe of the sodium ferrite is preferably from 0.7 to 1.3.

Since the molar ratio of Na/Fe is from 0.7 to 1.3, a large number of sodium ferrite crystal phases can be included, so that the fixation and recovery performance for carbon dioxide is satisfactory.

In the solid recovery material for carbon dioxide according to the present invention, the porous material is preferably a porous material selected from activated carbon, aluminosilicate, hydrotalcite, porous clay mineral, porous silica, and activated alumina.

Using the porous material enables a molded body containing sodium ferrite at a high concentration to be formed and fixation and recovery ability for carbon dioxide to be enhanced.

A method for producing the solid recovery material for carbon dioxide according to the present invention includes a step of performing solid-phase reaction of a material including iron oxide and an alkali compound including sodium.

In the method for producing the solid recovery material for carbon dioxide according to the present invention, a solid and a solid are mixed and reacted with each other by moving elements without using a solvent, and therefore, no solvent as reaction mother liquor is used, thereby reducing waste which is, for example, a solvent when used for liquid phase reaction. In particular, solid-phase reaction at a low temperature may result in very-high-concentration reaction, so that energy cost is reduced. Thus, the method for producing the solid recovery material for carbon dioxide according to the present invention can produce a carbon dioxide recovery material which is capable of fixing the carbon dioxide in a temperature range from the room temperature to 200° C. and highly efficiently recovering the carbon dioxide thus fixed when heated to 50 to 200° C., and which is thus excellent in fixation and recovery performance.

Advantageous Effects of Invention

The solid recovery material for carbon dioxide of the present invention enables the carbon dioxide to be fixed in a temperature range from the room temperature to 200° C. and enables the carbon dioxide to be highly efficiently recovered by heating to 50 to 200° C., and thus, the solid recovery material for carbon dioxide can have an excellent fixation and recovery performance for carbon dioxide.

DETAILED DESCRIPTION

Figure 1:
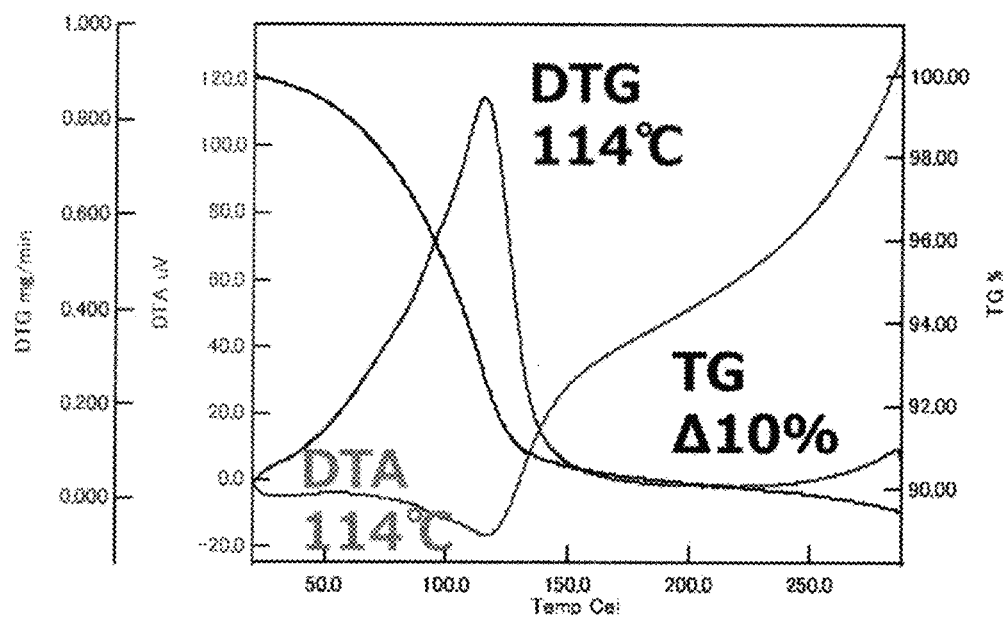
FIG. 1 is a view of a result of thermogravimetric analysis after a solid recovery material for carbon dioxide obtained in Example 1 absorbs the carbon dioxide.

Embodiments of the present invention will be described below. The following description of a preferable embodiment is substantially a mere example and should not be construed as limiting the present invention, the application method thereof, or the application thereof.

First Embodiment

First of all, a solid recovery material for carbon dioxide according to a first embodiment of the present invention will be described.

The solid recovery material for carbon dioxide according to the present embodiment includes from 1% by weight to 70% by weight of sodium ferrite and from 30% by weight to 99% by weight of porous material. In the case of the above-described range of % by weight, the sodium ferrite can be stably carried by the porous material while fixation and recovery performance, which the sodium ferrite intrinsically has, for carbon dioxide is maintained.

The solid recovery material for carbon dioxide according to the present embodiment has an average particle diameter of 1 mm to 10 mm and a specific surface area of 100 $m^2/g$ to 1500 $m^2/g$. In the case of the average particle diameter being less than 1 mm, when the solid recovery material for carbon dioxide according to the present embodiment is filled in the adsorption tower or the like, voids between powder particles are small, and therefore, pressure loss in the adsorption tower is large. Therefore, a clog may be formed in the adsorption tower. In the case of the average particle diameter being greater than 10 mm, the ratio of contact between the sodium ferrite and the carbon dioxide decreases, thereby deteriorating the fixation and recovery performance for carbon dioxide. The average particle diameter of the solid recovery material for carbon dioxide is preferably from 2 mm to 8 mm. Moreover, when the specific surface area is less than 100 $m^2/g$, the sodium ferrite is less likely to come into contact with carbon dioxide in the gas, thereby deteriorating the fixation and recovery performance for carbon dioxide. When the specific surface area is greater than 1500 $m^2/g$, industrial production becomes difficult. The specific surface area of the solid recovery material for carbon dioxide is preferably from 300 $m^2/g$ to 1000 $m^2/g$.

In the solid recovery material for carbon dioxide according to the present embodiment, an axial ratio of an average major axis diameter to an average minor axis diameter of primary particles of the sodium ferrite (average major axis diameter/average minor axis diameter) is from 1 to 2. When the axial ratio is greater than 2, the primary particles tend to aggregate, and maintaining a high dispersibility of the sodium ferrite becomes difficult. Moreover, the axial ratio cannot be less than 1. The axial ratio of the primary particles of the solid recovery material for carbon dioxide is preferably from 1.1 to 1.9.

The shape of the solid recovery material is not particularly limited but is preferably spherical, spindle, rectangular parallelepiped, dice, cylindrical, or the like.

The solid recovery material for carbon dioxide according to the present embodiment preferably has a hardness of 5 $kgf/mm^2$ to 35 $kgf/mm^2$ and a bulk density of 0.3 g/mL to 0.8 g/mL. In the case of the hardness and the bulk density in the above-described range, the solid recovery material is less likely to break due to gravity and/or friction or the like caused by a flow of an exhaust gas or the like when filled in the adsorption tower or the like, so that the exhaust gas or the like easily flows. More preferably, the hardness is from 6 $kgf/mm^2$ to 33 $kgf/mm^2$, and the bulk density is from 0.35 g/mL to 0.70 g/mL.

The solid recovery material for carbon dioxide according to the present embodiment preferably has a powder pH value of 8 to 14. When the powder pH value is from 8 to 14, the solid recovery material for carbon dioxide according to the present embodiment is basic and thus easily captures the carbon dioxide which is weakly acidic. A more preferable powder pH value is from 9 to 14.

In the solid recovery material for carbon dioxide according to the present embodiment, a molar ratio of Na/Fe of the sodium ferrite is preferably from 0.7 to 1.3. When the molar ratio is in the above-described range, a large number of sodium ferrite crystal phases can be included, so that the fixation and recovery performance for carbon dioxide is satisfactory.

The porous material according to the present embodiment is a porous material selected from activated carbon, a porous clay mineral such as zeolite, porous silica, and activated alumina. As the porous clay mineral, smectite, Sepiolite, imogolite, palygorskite, kaolin, montmorillonite, bentonite, attapulgite, acid clay, cordierite, limonite, or the like may be used alternatively to zeolite. Since the porous material has excellent adsorption, the porous material can carry a large amount of sodium ferrite, which enables the fixation and recovery ability for carbon dioxide to be enhanced. In particular, the activated carbon has a small pore diameter and thus has strong adsorptive power. Thus, the activated carbon carries a large amount of sodium ferrite, which enables the fixation and recovery ability for carbon dioxide to be enhanced, and therefore, the activated carbon is preferable.

The porous material preferably has a porosity of greater than 50% and less than or equal to 70%. When the porosity is less than or equal to 50%, the specific surface area of the solid recovery material for carbon dioxide, that is, the contact surface area to the carbon dioxide becomes small, so that the rate of carbon dioxide absorption may decrease. When the porosity is greater than 70%, the volume ratio of the sodium ferrite decreases, and the fixation and recovery performance for carbon dioxide is thus deteriorated.

The solid recovery material for carbon dioxide according to the present embodiment can selectively adsorb and fix the carbon dioxide from a gas including the carbon dioxide. The adsorption temperature is from the room temperature to an exhaust gas outlet temperature, namely, approximately from 10° C. to 200° C. Additionally heating from outside is not required, and therefore, energy cost relating to adsorption can be suppressed (up to here, carbon dioxide fixation step).

Preferably, the solid recovery material for carbon dioxide according to the present embodiment desorbs the carbon dioxide, captured in the carbon dioxide fixation step described above, at a temperature of 50 to 200° C. and recovers the carbon dioxide under a gas atmosphere including no carbon dioxide. The desorption temperature is as low as 200° C. or lower, and therefore, energy cost relating to desorption is suppressed (up to here, carbon dioxide recovery step).

Then, the method for producing the solid recovery material for carbon dioxide according to the first embodiment of the present invention will be described.

The solid recovery material for carbon dioxide according to the present embodiment can be obtained through reaction of a material including iron oxide and an alkali compound including sodium in the presence of the porous material (support).

When the reaction of the material including iron oxide and the alkali compound including sodium is caused in the presence of the porous material (support), a large amount of sodium ferrite tends to be carried on a surface of the support. The fixation and recovery performance for carbon dioxide is therefore improved and is thus preferable as the solid recovery material for carbon dioxide. Moreover, as a feature of the solid-phase reaction, the crystal growth of the sodium ferrite tends to be isotropic, and therefore, the axial ratio of the primary particles tends to be suppressed.

In a specific production method, iron oxide and sodium source powder are mixed to obtain a mixture, and additionally, a porous material is mixed with the mixture, thereby loading the mixture of the iron oxide and the sodium source powder on a surface of the porous material, which is then baked, thereby obtaining the solid recovery material for carbon dioxide according to the present embodiment. Granulation may be performed as needed. Moreover, for the baking, steam heating, microwave heating, ultrasonic wave heating, or the like may be used alternatively to normal baking.

Other production methods may be, for example, the following methods i) to iv). i) A sodium source aqueous solution is adsorbed on a porous material, is dried as it is, is added with iron oxide, and is subjected to solid-phase synthesis. ii) An iron oxide water slurry is adsorbed on a porous material, is dried as it is, and is added with sodium source powder, and is subjected to solid-phase synthesis. iii) Solid-phase reaction of iron oxide and sodium source powder is caused to obtain a resultant, which is loaded on a porous material. iv) Iron oxide and a sodium source are reacted with each other under a wet condition, are further loaded on a porous material under a wet condition, and are then dried.

As the support, for example, a porous material selected from a porous clay mineral such as activated carbon and zeolite, porous silica, and activated alumina may be used. As the porous clay mineral, smectite, Sepiolite, imogolite, palygorskite, kaolin, montmorillonite, bentonite, attapulgite, acid clay, cordierite, limonite, or the like may be used alternatively to zeolite. The content of the porous material is preferably from 30% by weight to 99% by weight. This is because carrying a large amount of sodium ferrite enhances the fixation and recovery ability for carbon dioxide as described above.

Examples of a material including iron oxide are not particularly limited but may include ferrous chloride tetrahydrate, iron (III) chloride hexahydrate, and iron (II) sulfate heptahydrate.

Examples of a compound including sodium are not particularly limited but may include sodium nitrite, sodium sulfate, sodium carbonate, sodium hydrogen carbonate, and sodium hydroxide. Note that when industrial use is taken into consideration, sodium nitrite, sodium sulfate, and the like should be avoided since these compounds may generate, at the time of manufacturing, a nitrous acid gas, a sulfurous acid gas, and the like which are toxic.

In general, the solid-phase reaction is a synthesis method in which a solid and a solid are mixed and reacted with each other by moving elements without using a solvent. No solvent as reaction mother liquor is used, and therefore, waste of a solvent and the like as used in liquid-phase reaction is reduced. Moreover, the solid-phase reaction at a low temperature, which is a feature of the present invention, may result in very-high-concentration reaction, so that energy cost is reduced. Further, the high-concentration reaction and/or cleaning is not required, and therefore, high yield of the product can be expected.

Second Embodiment

Now, a solid recovery material for carbon dioxide according to a second embodiment of the present invention will be described.

The solid recovery material for carbon dioxide according to the present embodiment includes greater than 70% by weight and less than or equal to 99% by weight of sodium ferrite and greater than or equal to 1% by weight and less than 30% by weight of porous material. In the case of the above-described range of % by weight, the solid recovery material for carbon dioxide according to the present embodiment enables a molded body containing sodium ferrite at a high concentration to be formed while fixation and recovery performance, which the sodium ferrite intrinsically has, for carbon dioxide is maintained.

The solid recovery material for carbon dioxide according to the present embodiment has an average particle diameter of 1 mm to 10 mm and a specific surface area of 5 $m^2/g$ to 500 $m^2/g$. In the case of the average particle diameter being less than 1 mm, when the solid recovery material for carbon dioxide according to the present embodiment is filled in the adsorption tower or the like, voids between powder particles are small, and therefore, pressure loss in the adsorption tower is large. Therefore, a clog may be formed in the adsorption tower. In the case of the average particle diameter being greater than 10 mm, the ratio of contact between the sodium ferrite and the carbon dioxide decreases, thereby deteriorating the fixation and recovery performance for carbon dioxide. The average particle diameter of the solid recovery material for carbon dioxide is preferably from 2 mm to 8 mm. Moreover, when the specific surface area is less than 5 $m^2/g$, the sodium ferrite is less likely to come into contact with carbon dioxide in the gas, thereby deteriorating the fixation and recovery performance for carbon dioxide. When the specific surface area is greater than 500 $m^2/g$, industrial production becomes difficult. The specific surface area of the solid recovery material for carbon dioxide is preferably from 30 $m^2/g$ to 300 $m^2/g$.

In the solid recovery material for carbon dioxide according to the present embodiment, an axial ratio of an average major axis diameter to an average minor axis diameter of primary particles of the sodium ferrite (average major axis diameter/average minor axis diameter) is from 1 to 2. When the axial ratio is greater than 2, the primary particles tend to aggregate, and maintaining a high dispersibility of the sodium ferrite becomes difficult. Moreover, the axial ratio cannot be less than 1. The axial ratio of the primary particles of the solid recovery material for carbon dioxide is preferably from 1.1 to 1.9.

In the solid recovery material for carbon dioxide according to the present embodiment, the average primary particle diameter of the primary particles of the sodium ferrite is preferably from 0.05 μm to 1.0 μm. When the average primary particle diameter is less than 0.05 μm, industrial production becomes difficult. Moreover, when the average primary particle diameter is greater than 1.0 μm, the absorption performance for carbon dioxide is deteriorated. More preferably, the average primary particle diameter is from 0.1 μm to 0.7 μm.

The solid recovery material for carbon dioxide according to the present embodiment preferably has a hardness of 3 $kgf/mm^2$ to 30 $kgf/mm^2$ and a degree of sphericity of 1 to 2. In the case of the hardness and the degree of sphericity in the respective ranges described above, the carbon dioxide recovery material according to the present embodiment is less likely to break due to gravity and/or friction or the like caused by a flow of an exhaust gas or the like when filled in the adsorption tower or the like, so that the exhaust gas or the like easily flows.

The shape of the solid recovery material for carbon dioxide is not particularly limited but is preferably spindle, rectangular parallelepiped, dice, cylindrical, or the like in addition to the spherical shape.

The solid recovery material for carbon dioxide according to the present embodiment preferably has a powder pH value of 8 to 14. When the powder pH value is from 8 to 14, the solid recovery material for carbon dioxide according to the present embodiment is basic and thus easily captures the carbon dioxide which is weakly acidic.

In the solid recovery material for carbon dioxide according to the present embodiment, a molar ratio of Na/Fe of the sodium ferrite is preferably from 0.7 to 1.3. When the molar ratio is in the above-described range, a large number of sodium ferrite crystal phases can be included, so that the fixation and recovery performance for carbon dioxide is satisfactory.

The porous material according to the present embodiment is preferably a porous material selected from activated carbon, aluminosilicate, hydrotalcite, porous clay mineral, porous silica, and activated alumina. As the porous clay mineral, zeolite, smectite, Sepiolite, imogolite, palygorskite, kaolin, montmorillonite, bentonite, attapulgite, acid clay, cordierite, limonite, or the like may be used. Since the porous material has excellent adsorption, the porous material enables a molded body containing sodium ferrite at a high concentration to be formed and the fixation and recovery ability for carbon dioxide to be enhanced.

The porous material preferably has a porosity of greater than 50% and less than or equal to 70%. When the porosity is less than or equal to 50%, the specific surface area of the solid recovery material for carbon dioxide, that is, the contact surface area to the carbon dioxide becomes small, so that the rate of carbon dioxide absorption may decrease. When the porosity is greater than 70%, the volume ratio of the sodium ferrite decreases, and the fixation and recovery performance for carbon dioxide is thus deteriorated.

The solid recovery material for carbon dioxide according to the present embodiment can selectively adsorb and fix the carbon dioxide from a gas including the carbon dioxide. The adsorption temperature is from the room temperature to an exhaust gas outlet temperature, namely, approximately from 10° C. to 200° C. Additionally heating from outside is not required, and therefore, energy cost relating to adsorption can be suppressed (up to here, carbon dioxide fixation step).

Preferably, the solid recovery material for carbon dioxide according to the present embodiment desorbs the carbon dioxide, captured in the carbon dioxide fixation step described above, at a temperature of 50 to 200° C. and recovers the carbon dioxide under a gas atmosphere including no carbon dioxide. The desorption temperature is as low as 200° C. or lower, and therefore, energy cost relating to desorption is suppressed (up to here, carbon dioxide recovery step).

Then, the method for producing the solid recovery material for carbon dioxide according to the second embodiment of the present invention will be described.

The solid recovery material for carbon dioxide according to the present embodiment can be obtained through reaction of a material including iron oxide and an alkali compound including sodium in the presence of the porous material (support).

When the reaction of the material including iron oxide and the alkali compound including sodium is caused in the presence of the porous material (support), a molded body tends to be formed which contains sodium ferrite at a high concentration and which is almost spheric in shape. The fixation and recovery performance for carbon dioxide is therefore improved and is thus preferable as the solid recovery material for carbon dioxide. Moreover, as a feature of the solid-phase reaction, the crystal growth of the sodium ferrite tends to be isotropic, and therefore, the axial ratio of the primary particles tends to be suppressed.

As a specific production method, first of all, iron oxide and sodium source powder are mixed with each other, are pulverized, and are baked, thereby obtaining sodium ferrite particle powder. Then, the sodium ferrite particle powder thus obtained and a porous material are mixed with each other and are granulated with a granulator such as a tumbling granulator, thereby obtaining a granulated substance. The granulated substance is then baked, thereby obtaining a solid recovery material for carbon dioxide. For the baking, steam heating, microwave heating, ultrasonic wave heating, or the like may be used alternatively to normal baking.

As the support, for example, a porous material selected from a porous clay mineral such as activated carbon, aluminosilicate, hydrotalcite, and zeolite, porous silica, and activated alumina may be used. As the porous clay mineral, smectite, Sepiolite, imogolite, palygorskite, kaolin, montmorillonite, bentonite, attapulgite, acid clay, cordierite, limonite, or the like may be used alternatively to zeolite. The content of the porous material is preferably greater than or equal to 1% by weight and less than 30% by weight. This is because forming a molded body containing sodium ferrite at high concentration enhances the fixation and recovery ability for carbon dioxide as described above.

Examples of a material including iron oxide are not particularly limited but may include hematite, magnetite, maghemite, and geothite.

Examples of a compound including sodium are not particularly limited but may include sodium nitrite, sodium hydroxide, sodium oxide, and sodium carbonate. Note that when industrial use is taken into consideration, sodium nitrite, sodium sulfate, and the like should be avoided since these compounds may generate, at the time of manufacturing, a nitrous acid gas, a sulfurous acid gas, and the like which are toxic.

In general, the solid-phase reaction is a synthesis method in which a solid and a solid are mixed and reacted with each other by moving elements without using a solvent. No solvent as reaction mother liquor is used, and therefore, waste of a solvent and the like as used in liquid-phase reaction is reduced. Moreover, the solid-phase reaction at a low temperature, which is a feature of the present invention, may result in very-high-concentration reaction, so that energy cost is reduced. Further, the high-concentration reaction and/or cleaning is not required, and therefore, high yield of the product can be expected.

EXAMPLES

A typical embodiment of the present invention is as described below.

Regarding the composition of the solid recovery material for carbon dioxide according to the present invention, the solid recovery material for carbon dioxide was pulverized by using a mortar, was pelletized, and was then subjected to identification by using a fully-automatic multi-purpose X-ray diffraction device D8 ADVANCE manufactured by BRUKER, and as a result, α-sodium ferrite and a porous material were identified.

The contents of the sodium ferrite and the porous material included in the solid recovery material for carbon dioxide according to the present invention were quantitated in such a manner that the solid recovery material for carbon dioxide was pulverized by using a mortar, was pelletized, and was then subjected to elemental analysis (except for oxygen) by using scanning fluorescent X-ray analyzer ZSX PrimusII manufactured by Rigaku Corporation.

The average particle diameter of the solid recovery material for carbon dioxide according to the present invention was defined as an average value of major axes and minor axes of 80 particles measured with a caliper.

The BET specific surface area of the solid recovery material for carbon dioxide according to the present invention was measured by a BET method using nitrogen with a Multisorb-16 manufactured by QUANTA CHROME.

The hardness of the solid recovery material for carbon dioxide according to the present invention was defined as an average value of compressive hardnesses of 80 particles measured with a digital force gauge ZP-500N manufactured by IMADA CO., LTD.

The bulk density of the solid recovery material for carbon dioxide according to the present invention was measured in accordance with JIS Z2504.

The bulk density of the solid recovery material for carbon dioxide according to the present invention was evaluated based on the following four levels.

⊚: Bulk density is from 0.3 to less than 0.5 g/mL.
○: Bulk density is from 0.5 to 0.8 g/mL.
Δ: Bulk density is greater than 0.8 and less than 2 g/mL.
×: Bulk density is less than 0.3 g/mL or greater than or equal to 2 g/mL.

The degree of sphericity of the solid recovery material for carbon dioxide according to the present invention was evaluated by calculating the ratio of major axis/minor axis and based on the following two levels.

○: Degree of sphericity is greater than or equal to 1 and less than 2.
×: Degree of sphericity is greater than or equal to 2.

Regarding the pH value of the solid recovery material for carbon dioxide according to the present invention, 5 g of sample were weighed in a 300 mL conical flask, 100 mL of boiling pure water were added in the flask and kept in a boiling state for about 5 minutes by heating, the flask was corked and allowed to cool to an ordinary temperature, water equivalent to a weight loss was added, and the flask was corked again, shaken for 1 minutes, and allowed to stand still for 5 minutes, thereby obtaining supernatant liquid, whose pH was measured in accordance with JIS Z8802-7 to obtain a value as the pH value.

To determine the molar ratio of Na/Fe of the sodium ferrite included in the solid recovery material for carbon dioxide according to the present invention, the solid recovery material for carbon dioxide was pulverized by using a mortar, was pelletized, and was then subjected to elemental analysis (except for oxygen) by using scanning fluorescent X-ray analyzer ZSX PrimusII manufactured by Rigaku Corporation.

Regarding the axial ratio of the sodium ferrite included in the carbon dioxide recovery material according to the present invention, an average major axis diameter and an average minor axis diameter of the particle diameters of 350 primary particles shown in a micrograph taken by a scanning electron microscope S-4800 manufactured by Hitachi High-Tech Corporation were measured and were shown as a ratio of the average major axis diameter to the average minor axis diameter (average major axis diameter/average minor axis diameter).

The average primary particle diameter of sodium ferrite particle powder included in the carbon dioxide recovery material according to the present invention was shown as an average value of average minor axis diameters and the average major axis diameter.

In order to investigate the fixation and recovery ability for carbon dioxide of the carbon dioxide recovery material according to the present invention, 1.00 part by weight of sample on a combustion boat was put in an acrylic tube equipped with pipes as an inlet and an outlet. From the inlet, a (carbon dioxide+nitrogen) mixture gas adjusted to have a humidity within a range from 20 to 100% and a carbon dioxide concentration within a range from 1 to 100 vol % was then introduced at 500 mL/min A temperature was then raised, for the adsorbed amount of carbon dioxide after two hours, from a room temperature to 200° C. by using a differential thermal thermogravimetry coincidence measurement device STA7000 manufactured by Hitachi High-Tech Corporation. From loss of the adsorbed amount on heating, the fixation and recovery amount of the carbon dioxide was determined.

<Method for Producing Solid Recovery Material for Carbon Dioxide>

Experimental Example 1

Example 1

In 900 parts by weight of pure water, 9.0 parts by weight of ferrous chloride tetrahydrate were dissolved to obtain a solution. In this solution, 10.0 parts by weight of granulated active carbon (KURARAY COAL 4GG manufactured by KURARAY CO., LTD., 4×6 mesh) as a porous support were added and were immersed for 1 hour. To this solution, 27 parts by weight of urea dissolved in 100 parts by weight of pure water were added, and the solution was heated to 90° C., was agitated for 3 hours, and was then agitated for 10 hours while allowed to cool. Thereafter, the solution was filtered through a sieve whose opening is 1 mm, and a solid left on the sieve was dried at 80° C. for 12 hours, thereby obtaining iron oxide-carrying activated carbon. The iron oxide-carrying activated carbon thus obtained and 1.80 parts by weight of sodium hydroxide were mixed with each other in solid form, were then put in a melting pot, and were subjected to solid-phase reaction in a nitrogen airflow at 400° C. for 16 hours, thereby obtaining a resultant product. Thereafter, the resultant product was cooled to a room temperature, thereby obtaining the solid recovery material for carbon dioxide. The solid recovery material for carbon dioxide thus obtained was pulverized and qualitatively evaluated by X-ray diffraction, and as a result, sodium ferrite and amorphous carbon were observed. Moreover, fluorescent X-rays showed that the content of the sodium ferrite was 33%. The content of the porous material was 67%. The BET specific surface area of the solid recovery material for carbon dioxide was 678 m$^2$/g. The minor axis was 4 mm, the major axis was 8 mm, and the average particle diameter was 6 mm. The powder pH value was 13.

The solid recovery material for carbon dioxide thus obtained had a hardness of 20 kgf/mm$^2$ and a bulk density of 0.48 g/mL. From these results, it is clear that the carbon dioxide recovery material according to Example 1 is less likely to break due to gravity and/or friction or the like caused by a flow of an exhaust gas or the like when filled in the carbon dioxide adsorption tower or the like, thereby allowing the exhaust gas or the like to easily flow. Note that the hardness of the carbon dioxide recovery material thus obtained was evaluated based on the following three levels.

○: Compressive hardness is greater than or equal to 10 kgf/mm$^2$.
Δ: Compressive hardness is from 5 to less than 10 kgf/mm$^2$.
x: Compressive hardness is less than 5 kgf/mm$^2$.

The molar ratio of Na/Fe of the sodium ferrite included in the solid recovery material for carbon dioxide thus obtained was 1.0, substantially equal to the feed ratio of the raw material.

In order to investigate the fixation and recovery performance for carbon dioxide of the solid recovery material for carbon dioxide thus obtained, 1.00 part by weight of sample was placed on No. 2 combustion boat (12×60×9 mm) and was aerated with a model combustion exhaust gas at 500 mL/min for two hours. In general, an exhaust gas produced when a fuel is burned in the atmosphere is constituted by 80 vol % nitrogen and 20 vol % carbon dioxide and has a relative humidity RH of 80 to 100% at maximum. Therefore, at a room temperature of 25° C., nitrogen at 400 mL/min and carbon dioxide at 100 mL/min were mixed with each other and were bubbled in water, thereby obtaining a model exhaust gas including 20 vol % carbon dioxide and having a relative humidity RH of 80%.

After the aeration, 10 mg of the sample were weighed, and while the sample was aerated with a dry air at 300 mL/min, the temperature of the sample was increased to 200° C. at 10° C./min by using an apparatus for thermogravimetry (TG), and the desorption temperature and the desorption amount of the carbon dioxide adsorbed on the sample were measured. A measurement chart is shown in FIG. 1, where the abscissa shows the sample temperature. The TG curved line shows % by weight of a remaining sample at respective temperatures provided that the sample in an initial state is 100% by weight, and the decreased weight of the sample is regarded to correspond to released carbon dioxide. The DTG curved line is the differential curve of the TG curved line, where the temperature at a maximum value of the DTG curved line is regarded to be the desorption temperature of the carbon dioxide. The DTA curved line shows a curved line which is convex downward, and it can be seen that endothermic reaction occurred at about 114° C. This was deemed to be the heat decomposition of $NaHCO_3$ and was quantified, and thereby, it can be seen that the desorption temperature of the carbon dioxide is 114° C., the desorption amount of the carbon dioxide is 10% by weight with respect to the sample solid content, and the fixation and recovery performance for carbon dioxide is excellent.

Moreover, the sample after the aeration was reprepared and the weight thereof was measured, and as a result, the weight was 1.15 parts by weight, and consequently, an increment of mass by 15% by weight was determined. The X-ray diffraction at a surface of this sample was measured, and thereby, 85% by weight of $Na_{1-x}FeO_2$ and 15% by weight of $NaHCO_3$ were determined, and thus, it was found that carbon dioxide was fixed on the sodium ferrite component. Further, this sample was heated in an electric furnace at 120° C. for 1 hour, and the weight thereof was measured, and the weight was 1.05 parts by weight, and it was found that 0.10 parts by weight (with respect to the solid recovery material for carbon dioxide, 10% by weight) of carbon dioxide were able to be adsorbed and desorbed at this cycle. The X-ray diffraction at a surface of this sample was measured, and thereby, 90% by weight of $NaFeO_2$ and 10% by weight of $Na_2CO_3$ were determined. Moreover, when carbon dioxide was brought into contact with this sample in a manner similar to that described above, the weight of the sample increased to 1.15 parts by weight, whereas when this sample was heated, the weight decreased to 1.05 parts by weight, and 0.10 parts by weight (10% by weight with respect to the solid recovery material for carbon dioxide) of carbon dioxide were able be adsorbed and desorbed. This operation was repeated 10 times, and it was confirmed that there is no change in mass increment and mass decrement. This clarifies that the solid recovery material for carbon dioxide according to Example 1 has an excellent fixation and recovery performance for carbon dioxide, in particular, is excellent in repetition performance.

Examples 2 to 8

Solid recovery materials according to Examples 2 to 8 were obtained in the same manner as that explained in Example 1 except that the types and amounts of the iron raw material and the support were changed.

Table 1 shows production conditions for these examples, Table 2 shows characteristics of the solid recovery materials for carbon dioxide thus obtained, and Table 3 shows the effects of these examples.

Comparative Example 1

In 900 parts by weight of pure water, 9.0 parts by weight of ferrous chloride tetrahydrate were dissolved and were agitated for 1 hour. To this solution, 27 parts by weight of urea dissolved in 100 parts by weight of pure water were added, and the solution was heated to 90° C., was agitated for 3 hours, and was then agitated for 10 hours while allowed to cool, was filtered and washed, and was dried at 80° C. for 12 hours, thereby obtaining iron oxide fine particles. The iron oxide fine particles thus obtained and 1.80 parts by weight of sodium hydroxide were mixed with each other in solid form, were then put in a melting pot, and were subjected to solid-phase reaction in a nitrogen airflow at 400° C. for 16 hours, thereby obtaining powder. The powder thus obtained was pulverized and was evaluated by X-ray diffraction, and as a result, sodium ferrite was identified. Moreover, fluorescent X-rays showed that the content of the sodium ferrite was 90% by weight. The remaining 10% by weight were maghemite. The powder thus obtained was suspended in 100 parts by weight of pure water to obtain a solution, and to this solution, 10 parts by weight of activated carbon were added as a porous support and were agitated for 16 hours, and then, moisture was distilled away by using an evaporator while rotating the solution, thereby obtaining the solid recovery material for carbon dioxide. The solid recovery material thus obtained was pulverized and qualitatively evaluated by X-ray diffraction, and as a result, maghemite, sodium ferrite, and amorphous carbon were identified. Moreover, fluorescent X-rays showed that the content of the maghemite and sodium ferrite was 33%. The content of the porous material was 67%. The BET specific surface area of the solid recovery material for carbon dioxide was 700 $m^2/g$. The minor axis was 4 mm, the major axis was 8 mm, and the average particle diameter was 6 mm. Moreover, in the same manner as that in the examples, the fixation and recovery performance for carbon dioxide was investigated. Here, the temperature was increased to 200° C., but no desorption of the carbon dioxide was observed.

Table 1 shows production conditions for the comparative example, Table 2 shows characteristics of the solid recovery materials for carbon dioxide thus obtained, and Table 3 shows the effects of the comparative example.

|  | Iron Raw Material | | Porous Material | | | |
|---|---|---|---|---|---|---|
|  | Type | Parts by Weight | Type | Shape | Mesh | Parts by Weight |
| Example 1 | $FeCl_2 \cdot 4H_2O$ | 9.0 | Activated Carbon | Cylindrical (Granulation) | 4 × 6 | 10.0 |
| Example 2 | $FeCl_2 \cdot 4H_2O$ | 9.0 | Activated Carbon | Cylindrical (Granulation) | 4 × 6 | 2.5 |
| Example 3 | $FeCl_2 \cdot 4H_2O$ | 9.0 | Activated Carbon | Cylindrical (Granulation) | 4 × 6 | 5.0 |
| Example 4 | $FeCl_2 \cdot 4H_2O$ | 9.0 | Activated Carbon | Irregular (Crush) | 8 × 14 | 20.0 |
| Example 5 | $FeCl_2 \cdot 4H_2O$ | 9.0 | Activated Carbon | Irregular (Crush) | 10 × 16 | 45.0 |
| Example 6 | $FeCl_3 \cdot 6H_2O$ | 12.2 | Zeolite | Spherical (Granulation) | 4 × 8 | 10.0 |
| Example 7 | $FeSO_4 \cdot 7H_2O$ | 12.5 | Porous Silica | Spherical (Granulation) | 4 × 6 | 10.0 |
| Example 8 | $FeCl_3 \cdot 6H_2O$ + $FeSO_4 \cdot 7H_2O$ | 8.1 + 4.2 | Activated Alumina | Spherical (Granulation) | 4 × 6 | 10.0 |
| Comparative Example 1 | $FeCl_2 \cdot 4H_2O$ | 9.0 | Activated Carbon | Cylindrical (Granulation) | 4 × 6 | 10.0 |

|  | Oxidizing Agent | | Sodium Raw Material | | Raw Material Feed Na/Fe (Molar Ratio) | Baking | |
|---|---|---|---|---|---|---|---|
|  | Type | Parts by Weight | Type | Parts by Weight |  | Temperature (° C.) | Time (Hour) |
| Example 1 | Urea | 27 | Sodium Hydroxide | 1.80 | 1.0 | 400 | 16 |
| Example 2 | Urea | 27 | Sodium Hydroxide | 1.98 | 1.1 | 400 | 16 |
| Example 3 | Urea | 27 | Sodium Hydroxide | 2.16 | 1.2 | 300 | 16 |
| Example 4 | Urea | 27 | Sodium Hydroxide | 1.62 | 0.9 | 300 | 20 |
| Example 5 | Urea | 27 | Sodium Hydroxide | 1.44 | 0.8 | 200 | 32 |
| Example 6 | Sodium Hydroxide | 9 | Sodium Oxide | 1.80 | 1.0 | 400 | 16 |
| Example 7 | Sodium Hydroxide | 9 | Sodium Carbonate | 1.80 | 1.0 | 600 | 16 |
| Example 8 | Sodium Hydroxide | 9 | Sodium Nitrite | 1.80 | 1.0 | 400 | 16 |
| Comparative Example 1 | Urea | 27 | Sodium Hydroxide | 1.80 | 1.0 | 400 | 16 |

|  | Composition | | Particle Diameter | | | | | | |
| --- | --- | --- | --- | --- | --- | --- | --- | --- | --- |
|  | Sodium Ferrite (% by Weight) | Porous Support (% by Weight) | Minor Axis (mm) | Major Axis (mm) | Average Particle Diameter (mm) | Specific Surface Area ($m^2/g$) | Hardness ($kgf/mm^2$) | Evaluation of Hardness | Bulk Density (g/ml) |
| Example 1 | 33 | 67 | 4 | 8 | 6 | 678 | 20 | ○ | 0.48 |
| Example 2 | 67 | 33 | 4 | 8 | 6 | 352 | 32 | ○ | 0.52 |
| Example 3 | 50 | 50 | 4 | 8 | 6 | 572 | 25 | ○ | 0.49 |
| Example 4 | 20 | 80 | 2 | 4 | 3 | 865 | 16 | ○ | 0.45 |
| Example 5 | 10 | 90 | 1 | 2 | 1.5 | 923 | 14 | ○ | 0.43 |
| Example 6 | 33 | 67 | 4 | 8 | 6 | 775 | 6 | Δ | 0.60 |
| Example 7 | 33 | 67 | 4 | 8 | 6 | 823 | 8 | Δ | 0.40 |
| Example 8 | 33 | 67 | 4 | 8 | 6 | 557 | 9 | Δ | 0.50 |
| Comparative Example 1 | 33 | 67 | 4 | 8 | 6 | 700 | 20 | ○ | 0.50 |

|  |  |  |  | Included Sodium Ferrite | | | |
| --- | --- | --- | --- | --- | --- | --- | --- |
|  | Evaluation of Bulk Density | pH (—) | Na/Fe (Molar Ratio) | Average Major Axis Diameter (μm) | Average Minor Axis Diameter (μm) | Axial Ratio (Average Major Axis Diameter/ Average Minor Axis) | Average Primary Particle Diameter (μm) |
| Example 1 | ◎ | 13 | 1.0 | 0.7 | 0.4 | 1.6 | 0.57 |
| Example 2 | ○ | 13 | 1.1 | 0.6 | 0.5 | 1.2 | 0.55 |
| Example 3 | ◎ | 13 | 1.2 | 0.8 | 0.5 | 1.8 | 0.63 |
| Example 4 | ◎ | 13 | 0.9 | 0.4 | 0.2 | 1.8 | 0.28 |
| Example 5 | ◎ | 13 | 0.8 | 0.4 | 0.3 | 1.3 | 0.35 |
| Example 6 | ○ | 13 | 1.0 | 0.4 | 0.3 | 1.3 | 0.36 |
| Example 7 | ◎ | 11 | 1.0 | 0.4 | 0.3 | 1.3 | 0.36 |
| Example 8 | ○ | 12 | 1.0 | 0.4 | 0.3 | 1.4 | 0.34 |
| Comparative Example 1 | ○ | 13 | 1.0 | 2.3 | 0.6 | 3.8 | 1.45 |

TABLE 3

|  | $CO_2$ Recovery Temperature (° C.) | $CO_2$ Recovery Amount (% by Weight) |
| --- | --- | --- |
| Example 1 | 114 | 10 |
| Example 2 | 116 | 15 |
| Example 3 | 115 | 13 |
| Example 4 | 104 | 8 |
| Example 5 | 102 | 5 |
| Example 6 | 121 | 8 |
| Example 7 | 108 | 8 |
| Example 8 | 100 | 6 |
| Comparative Example 1 | — | nd |

Experimental Example 2

Example 9

Iron oxide fine particles 1 (100ED manufactured by TODA KOGYO CORP., hematite, specific surface area 11 $m^2/g$) were weighed to 100 parts by weight. Sodium nitrite particle powder which is a sodium raw material was weighed such that Na/Fe=1.0 (molar ratio) with respect to the iron oxide fine particles, and the sodium nitrite particle powder was pulverized by using a sample mill to obtain a mixed pulverized product. The mixed pulverized product was put in a melting pot and was baked at 400° C. for 16 hours. Then, the mixed pulverized product was cooled to a room temperature and was pulverized by using a sample mill, thereby obtaining sodium ferrite particle powder. The BET specific surface area of the sodium ferrite particle powder thus obtained was 4.0 $m^2/g$. As a result of quantification of primary particles by a scanning electron microscope, the average major axis diameter was 0.7 μm, the average minor axis diameter was 0.4 μm, the average primary particle diameter was 0.57 μm, and the axial ratio was 1.6. The powder pH value was 13.8 and was relatively high. With the 100 parts by weight of sodium ferrite particle powder thus obtained, 5 parts by weight of powder activated carbon as a porous material were mixed and were subjected to tumbling granulation at 40 rpm by using a tumbling granulator, thereby obtaining a granulated substance having a spherical shape and having a particle diameter of 5 mm. The granulated substance was put in a melting pot and baked in a nitrogen gas stream at 400° C. for 16 hours. Thereafter, the granulated substance was cooled to a room temperature, thereby obtaining the solid recovery material for carbon dioxide. The solid recovery material for carbon dioxide thus obtained was pulverized and qualitatively evaluated by X-ray diffraction, and as a result, sodium ferrite and amorphous carbon were identified. Moreover, fluorescent X-rays showed that the content of the sodium ferrite was 95%. The content of the porous material was 5%. The BET specific surface area of the solid recovery material for carbon dioxide was 54 $m^2/g$. The minor axis was 5 mm, the major axis was 5 mm, and the average particle diameter was 5 mm. The powder pH value was 13.

The solid recovery material for carbon dioxide thus obtained had a hardness of 10 $kgf/mm^2$ and a degree of sphericity of 1.0. From these results, it is clear that the carbon dioxide recovery material according to Example 9 is less likely to break due to gravity and/or friction or the like caused by a flow of an exhaust gas or the like when filled in the carbon dioxide adsorption tower or the like, thereby allowing the exhaust gas or the like to easily flow. Note that the hardness of the carbon dioxide recovery material thus obtained was evaluated based on the following three levels.

◯: Compressive hardness is greater than or equal to 10 kgf/mm$^2$.

Δ: Compressive hardness is greater than or equal to 3 kgf/mm$^2$ and less than 10 kgf/mm$^2$.

x: Compressive hardness is less than 3 kgf/mm$^2$.

The molar ratio of Na/Fe of the sodium ferrite included in the solid recovery material for carbon dioxide thus obtained was 1.0, substantially equal to the feed ratio of the raw material.

In order to investigate the fixation and recovery performance for carbon dioxide of the solid recovery material for carbon dioxide thus obtained, 1.00 part by weight of sample was placed on No. 2 combustion boat (12×60×9 mm) and was aerated with a model combustion exhaust gas at 500 mL/min for two hours. In general, an exhaust gas produced when a fuel is burned in the atmosphere is constituted by 80 vol % nitrogen and 20 vol % carbon dioxide and has a relative humidity RH of 80 to 100% at maximum. Therefore, at a room temperature of 25° C., nitrogen at 400 mL/min and carbon dioxide at 100 mL/min were mixed with each other and were bubbled in water, thereby obtaining a model exhaust gas including 20 vol % carbon dioxide and having a relative humidity RH of 80%.

Figure 2:
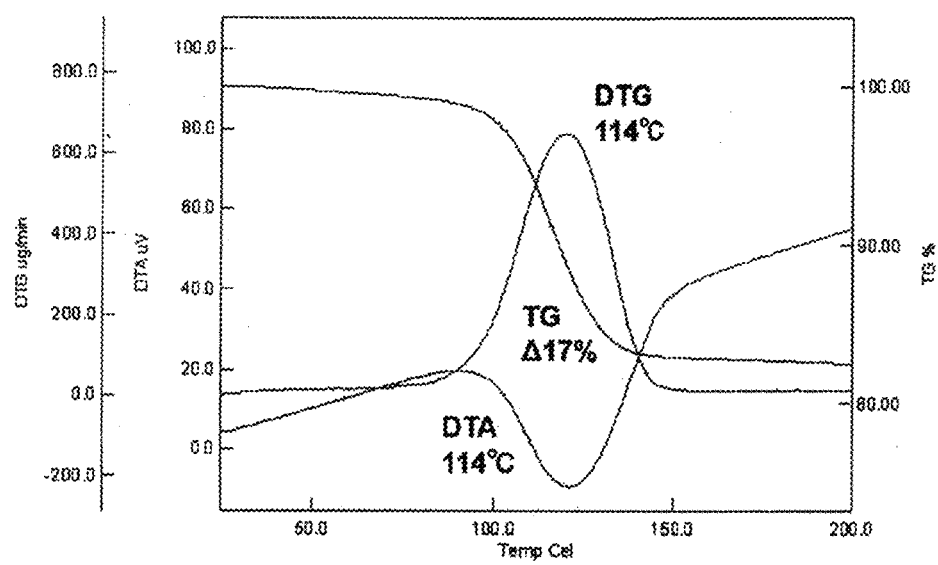
FIG. 2 is a view of a result of thermogravimetric analysis after a solid recovery material for carbon dioxide obtained in Example 9 absorbs the carbon dioxide.

After the aeration, 10 mg of the sample were weighed, and while the sample was aerated with a dry air at 300 mL/min, the temperature of the sample was increased to 200° C. at 10° C./min by using an apparatus for thermogravimetry (TG), and the desorption temperature and the desorption amount of the carbon dioxide adsorbed on the sample were measured. A measurement chart is shown in FIG. 2, where the abscissa shows the sample temperature. The TG curved line shows % by weight of a remaining sample at respective temperatures provided that the sample in an initial state is 100% by weight, and the decreased weight of the sample is regarded to correspond to released carbon dioxide. The DTG curved line is the differential curve of the TG curved line, where the temperature at a maximum value of the DTG curved line is regarded to be the desorption temperature of the carbon dioxide. The DTA curved line shows a curved line which is convex downward, and it can be seen that endothermic reaction occurred at about 114° C. This was deemed to be the heat decomposition of NaHCO$_3$ and was quantified, and thereby, it can be seen that the desorption temperature of the carbon dioxide is 114° C., the desorption amount of the carbon dioxide is 17% by weight with respect to the sample solid content, and the fixation and recovery performance for carbon dioxide is excellent.

Moreover, the sample after the aeration was reprepared and the weight thereof was measured, and as a result, the weight was 1.27 parts by weight, and consequently, an increment of mass by 27% by weight was determined. The X-ray diffraction at a surface of this sample was measured, and as a result, 79% by weight of Na$_{1-x}$FeO$_2$ and 21% by weight of NaHCO$_3$ were determined, and thus, it was found that carbon dioxide was fixed on the sodium ferrite component. Further, this sample was heated in an electric furnace at 120° C. for 1 hour, and the weight thereof was measured, and the weight was 1.10 parts by weight, and it was found that 0.17 parts by weight (with respect to the solid recovery material for carbon dioxide, 17% by weight) of carbon dioxide were able to be adsorbed and desorbed at this cycle.

The X-ray diffraction at a surface of this sample was measured, and as a result, 90% by weight of Na$_{1-x}$FeO$_2$ and 10% by weight of Na$_2$CO$_3$ were determined. Moreover, when carbon dioxide was brought into contact with this sample in a manner similar to that described above, the weight of the sample increased to 1.27 parts by weight, whereas when this sample was heated, the weight decreased to 1.10 parts by weight, and 0.17 parts by weight (17% by weight with respect to the solid recovery material for carbon dioxide) of carbon dioxide were able to be adsorbed and desorbed. This operation was repeated 10 times, and it was confirmed that there is no change in mass increment and mass decrement. This clarifies that the solid recovery material for carbon dioxide according to Example 9 has an excellent fixation and recovery performance for carbon dioxide, in particular, is excellent in repetition performance.

Examples 10 to 16

Solid recovery materials according to Examples 10 to 16 were obtained in the same manner as that explained in Example 9 except that the types and amounts of the iron raw material and the support were changed.

Table 4 shows production conditions for these examples, Table 5 shows characteristics of the solid recovery materials for carbon dioxide thus obtained, and Table 6 shows the effects of these examples.

Comparative Example 2

While a small quantity of 1% carboxy methyl cellulose aqueous solution was added, 100 parts by weight of the sodium ferrite particle powder obtained in Example 9 were granulated at 40 rpm by using a tumbling granulator to obtain granules, which were then put in a melting pot and were subjected to solid-phase reaction in a nitrogen airflow at 400° C. for 16 hours. Thereafter, the granules were cooled to a room temperature, thereby obtaining the solid recovery material for carbon dioxide. The solid recovery material for carbon dioxide thus obtained was pulverized and qualitatively evaluated by X-ray diffraction, and as a result, sodium ferrite was identified. Moreover, fluorescent X-rays showed that the content of the sodium ferrite was 100%. The BET specific surface area of the solid recovery material for carbon dioxide was 4 m$^2$/g. The minor axis was 4 mm, the major axis was 9 mm, and the average particle diameter was 6.5 mm. The powder pH value was 10.

The solid recovery material for carbon dioxide thus obtained had a hardness of 1 kgf/mm$^2$ and was evaluated as x. Moreover, the degree of sphericity was 2.3 and was evaluated as x. These results clarify that filling of the carbon dioxide recovery material is difficult because the carbon dioxide recovery material is likely to break due to, for example, gravity and/or friction caused by a flow of an exhaust gas or the like when filled in the carbon dioxide adsorption tower or the like, and the carbon dioxide recovery material is non-uniform in shape.

Table 4 shows production conditions for this comparative example, Table 5 shows characteristics of the solid recovery materials for carbon dioxide thus obtained, and Table 6 shows the effects of these examples.

| | Iron Oxide Raw Material | | | Raw Material | | First Baking Temperature (° C.) |
|---|---|---|---|---|---|---|
| | Type | Specific Surface Area (m²/g) | Parts by Weight | Sodium Raw Material Type | Parts by Weight | Feed Na/Fe (Molar Ratio) |
| Example 9 | Hematite | 11 | 100 | Sodium Nitrite | 108 | 1.0 | 400 |
| Example 10 | Hematite | 11 | 100 | Sodium Nitrite | 119 | 1.1 | 400 |
| Example 11 | Magnetite | 8 | 100 | Sodium Hydroxide | 62 | 1.2 | 300 |
| Example 12 | Magnetite | 8 | 100 | Sodium Hydroxide | 56 | 0.9 | 300 |
| Example 13 | Maghemite | 8 | 100 | Sodium Hydroxide | 50 | 0.8 | 200 |
| Example 14 | Maghemite | 8 | 100 | Sodium Oxide | 19 | 1.0 | 400 |
| Example 15 | Geothite | 12 | 100 | Sodium Carbonate | 60 | 1.0 | 600 |
| Example 16 | Magnetite + Geothite | 11, 12 | 50 + 50 | Sodium Nitrite | 84 | 1.0 | 400 |
| Comparative Example 2 | Hematite | 1 | 100 | Sodium Nitrite | 108 | 1.0 | 400 |

| | First Baking Time (Hour) | Porous Material Type | Primary Particle Size (μm) | Additive Amount with Respect to 100 Parts by Weight Sodium Ferrite | Second Baking Temperature (° C.) | Time (Hour) |
|---|---|---|---|---|---|---|
| Example 9 | 16 | Activated Carbon | 6 | 5.0 | 400 | 16 |
| Example 10 | 16 | Activated Carbon | 6 | 1.0 | 400 | 16 |
| Example 11 | 16 | Activated Carbon | 6 | 3.0 | 300 | 16 |
| Example 12 | 20 | Aluminosilicate | 6 | 20.0 | 300 | 20 |
| Example 13 | 32 | Hydrotalcite | 6 | 30.0 | 200 | 32 |
| Example 14 | 16 | Zeolite | 10 | 10.0 | 400 | 16 |
| Example 15 | 16 | Porous Silica | 3 | 10.0 | 600 | 16 |
| Example 16 | 16 | Activated Alumina | 5 | 10.0 | 400 | 16 |
| Comparative Example 2 | 16 | — | — | — | 400 | 16 |

| | Composition | | Particle Diameter | | | | Evaluation of Degree of Sphericity | Specific Surface Area (m²/g) |
|---|---|---|---|---|---|---|---|---|
| | Sodium Ferrite (Weight %) | Porous Support (Weight %) | Minor Axis (mm) | Major Axis (mm) | Average Particle Diameter (mm) | Degree of Sphericity | | |
| Example 9 | 95 | 5 | 5.0 | 5.0 | 5.0 | 1.0 | ○ | 54 |
| Example 10 | 99 | 1 | 7.0 | 8.0 | 7.5 | 1.1 | ○ | 8 |
| Example 11 | 97 | 3 | 6.0 | 7.0 | 6.5 | 1.2 | ○ | 34 |
| Example 12 | 83 | 17 | 1.4 | 2.0 | 1.7 | 1.4 | ○ | 108 |
| Example 13 | 77 | 23 | 0.5 | 0.9 | 0.7 | 1.8 | ○ | 258 |
| Example 14 | 91 | 9 | 2.0 | 3.0 | 2.5 | 1.5 | ○ | 76 |
| Example 15 | 91 | 9 | 2.0 | 3.0 | 2.5 | 1.5 | ○ | 94 |
| Example 16 | 91 | 9 | 2.0 | 3.0 | 2.5 | 1.5 | ○ | 111 |
| Comparative Example 2 | 100 | 0 | 4.0 | 9.0 | 6.5 | 2.3 | X | 4 |

-continued

|  | Hardness (kgf/mm²) | Evaluation of Hardness | pH (—) | Na/Fe (Molar Ratio) | Included Sodium Ferrite | | | Average Primary Particle Diameter (μm) |
|---|---|---|---|---|---|---|---|---|
|  |  |  |  |  | Average Major Axis Diameter (μm) | Average Minor Axis Diameter (μm) | Axial Ratio (Average Major Axis Diameter/ Average Minor Axis Diameter) |  |
| Example 9 | 10 | ○ | 13 | 1.0 | 0.7 | 0.4 | 1.6 | 0.57 |
| Example 10 | 5 | Δ | 13 | 1.1 | 0.6 | 0.5 | 1.2 | 0.55 |
| Example 11 | 7 | ○ | 13 | 1.2 | 0.8 | 0.5 | 1.8 | 0.63 |
| Example 12 | 11 | ○ | 13 | 0.9 | 0.4 | 0.2 | 1.8 | 0.28 |
| Example 13 | 8 | Δ | 13 | 0.8 | 0.4 | 0.3 | 1.3 | 0.35 |
| Example 14 | 13 | ○ | 13 | 1.0 | 0.4 | 0.3 | 1.3 | 0.36 |
| Example 15 | 12 | ○ | 11 | 1.0 | 0.4 | 0.3 | 1.3 | 0.36 |
| Example 16 | 16 | ○ | 12 | 1.0 | 0.4 | 0.3 | 1.4 | 0.34 |
| Comparative Example 2 | 1 | X | 10 | 1.0 | 2.3 | 0.6 | 3.8 | 1.45 |

TABLE 6

|  | $CO_2$ Recovery Temperature (° C.) | $CO_2$ Recovery Amount (% by Weight) |
|---|---|---|
| Example 9 | 114 | 17 |
| Example 10 | 116 | 18 |
| Example 11 | 115 | 17 |
| Example 12 | 104 | 15 |
| Example 13 | 102 | 14 |
| Example 14 | 121 | 16 |
| Example 15 | 108 | 16 |
| Example 16 | 100 | 16 |
| Comparative Example 2 | 130 | 10 |

As described above, the solid recovery material for carbon dioxide according to the present invention is obviously excellent in adsorption and recovery for the carbon dioxide. Moreover, the solid recovery material has a high hardness and has a high degree of sphericity or a low bulk density, and can thus be filled into a carbon dioxide adsorption tower as it is.

What is claimed is:

1. A solid recovery material for carbon dioxide, the solid recovery material comprising:
    from 1% by weight to 99% by weight of sodium ferrite; and
    from 1% by weight to 99% by weight of porous material, wherein
    the solid recovery material has an average particle diameter of 1 mm to 10 mm and has a specific surface area of 5 m²/g to 1500 m²/g,
    an axial ratio of an average major axis diameter to an average minor axis diameter of primary particles of the sodium ferrite is from 1 to 2, and
    a bulk density of the solid recovery material is 0.8 g/mL or less.

2. The solid recovery material of claim 1,
    comprising from 1% by weight to 70% by weight of the sodium ferrite,
    comprising from 30% by weight to 99% by weight of the porous material, and
    having a specific surface area of 100 m²/g to 1500 m²/g.

3. The solid recovery material of claim 2,
    having a hardness of 5 kgf/mm² to 35 kgf/mm², and
    having a bulk density of 0.3 g/mL to 0.8 g/mL.

4. The solid recovery material of claim 1,
    comprising greater than 70% by weight and less than or equal to 99% by weight of the sodium ferrite,
    comprising greater than or equal to 1% by weight and less than 30% by weight of the porous material, and
    having a specific surface area of 5 m²/g to 500 m²/g.

5. The solid recovery material of claim 4,
    having a hardness of 3 kgf/mm² to 30 kgf/mm² and
    having a degree of sphericity of 1 to 2.

6. The solid recovery material of claim 1,
    having a powder pH value of 8 to 14.

7. The solid recovery material of claim 1, wherein
    a molar ratio of Na/Fe of the sodium ferrite is from 0.7 to 1.3.

8. The solid recovery material of claim 1, wherein
    the porous material is a porous material selected from activated carbon, aluminosilicate, hydrotalcite, porous clay mineral, porous silica, and activated alumina.

9. A method for producing the solid recovery material of claim 1, the method comprising a step of performing solid-phase reaction of a material including iron oxide and an alkali compound including sodium.

* * * * *